(No Model.)
C. SCHILLO.
BAYONET.
No. 361,328. Patented Apr. 19, 1887.
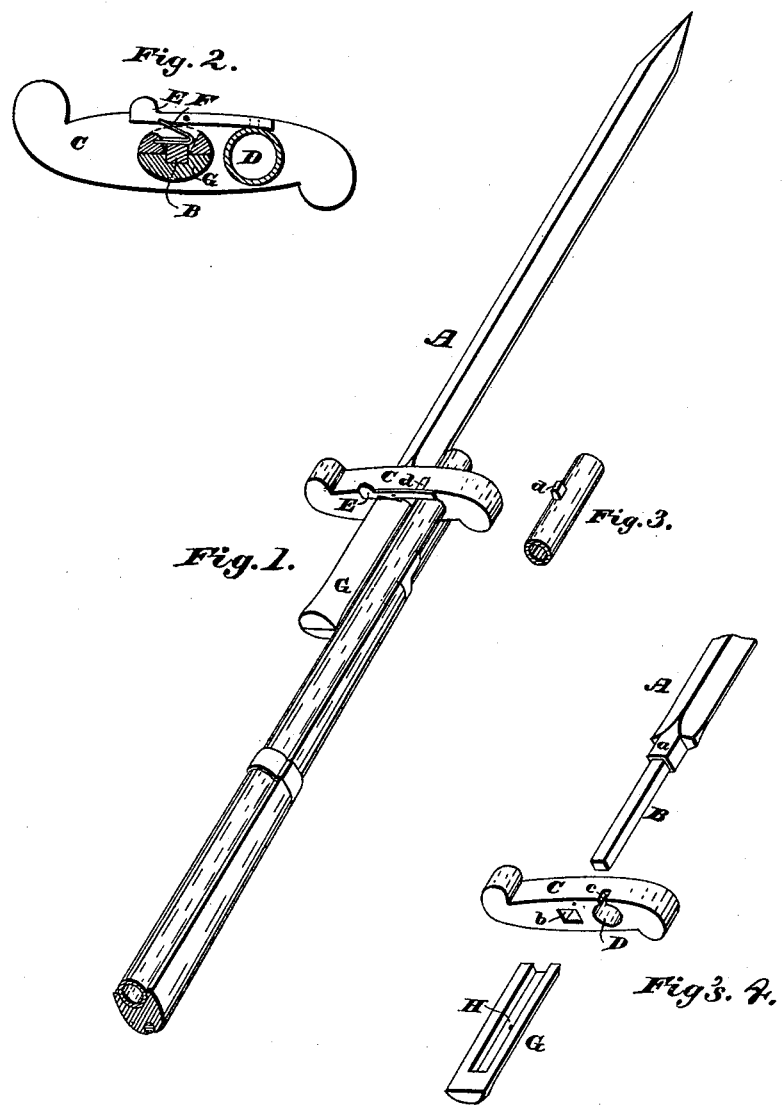
WITNESSES:
Harry Frease
Frank D. Marten
INVENTOR
BY Conrad Schillo
Fred M. Bond
his ATTORNEY

UNITED STATES PATENT OFFICE.

CONRAD SCHILLO, OF CANTON, OHIO.

BAYONET.

SPECIFICATION forming part of Letters Patent No. 361,328, dated April 19, 1887.

Application filed February 7, 1887. Serial No. 226,754. (No model.)

*To all whom it may concern:*

Be it known that I, CONRAD SCHILLO, a citizen of the United States, residing at Canton, in the county of Stark and State of Ohio, have invented certain new and useful Improvements in Bayonets; and I do hereby declare that the following is a full, clear, and exact description of the same, reference being had to the annexed drawings, making a part of this specification, and to the letters and figures of reference marked thereon, in which—

Figure 1 is a view showing the bayonet attached to the muzzle of a gun. Fig. 2 is a view of the hilt, showing cross-section of the handle, shank, and gun-barrel. Fig. 3 is a view of a portion of the gun-barrel. Fig. 4 shows views of different parts, showing them detached.

The present invention has relation to sword-bayonets; and its nature consists in the different parts and combination of parts hereinafter described, and particularly pointed out in the claim.

Similar letters of reference indicate corresponding parts in all the figures of drawings.

In the accompanying drawings, A represents the sword or bayonet, which may be substantially of the form shown in the drawings. The shank B is formed square, and is made integral with the sword or bayonet A. The shank B is also provided with the head $a$, which enters the hilt C through the aperture $b$, said head $a$ and aperture $b$ being so formed that the hilt cannot turn on the head. The hilt C is provided with the aperture D, which aperture is to correspond in size with the gun-barrel, as illustrated in Fig. 2. The hilt is also provided with the recess $e$, which is for the purpose of receiving the projection or sight $d$, and thereby prevent the hilt C from turning on the gun-barrel. To the hilt C is pivotally attached the lever E, which is located substantially as shown in Figs. 1 and 2, and is for the purpose of catching under the projection or sight $d$, as shown in Fig. 1, and thereby prevent the bayonet from being detached. For the purpose of securely holding the lever E in proper position, the spring F is provided, which is attached to one of the handle cheek-pieces G, substantially as shown in Fig. 2.

The handle of the bayonet or sword A is formed by cheek-pieces G. These cheek-pieces G are each provided with the groove H, which are for the purpose of receiving the shank B. The cheek-pieces G are securely held to the shank B by means of suitable rivets.

It will be seen that by my peculiar arrangement the bayonet can be easily detached from the barrel of the gun, when it can be used as a sword.

Having fully described my invention, what I claim, and desire to secure by Letters Patent, is—

The combination of the sword or bayonet A, having formed integral therewith the shank B and the head $a$, the hilt C, provided with the apertures $b$ and D, and the recess $e$, the lever E, pivotally attached to the hilt C, the spring F, the handle or cheek-pieces G, and the projection or sight $d$, substantially as and for the purpose specified.

In testimony that I claim the above I have hereunto subscribed my name in the presence of two witnesses.

CONRAD SCHILLO.

Witnesses:
FRANK S. MASTEN,
FRED W. BOND.